(12) United States Patent
Suzuki

(10) Patent No.: US 10,739,557 B2
(45) Date of Patent: Aug. 11, 2020

(54) IMAGING LENS AND IMAGING APPARATUS

(71) Applicant: FUJIFILM Corporation, Tokyo (JP)

(72) Inventor: Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 156 days.

(21) Appl. No.: 16/120,474

(22) Filed: Sep. 4, 2018

(65) Prior Publication Data

US 2019/0079268 A1    Mar. 14, 2019

(30) Foreign Application Priority Data

Sep. 14, 2017  (JP) .................. 2017-176474

(51) Int. Cl.
| | | |
|---|---|---|
| *G02B 13/18* | (2006.01) | |
| *G02B 9/64* | (2006.01) | |
| *G02B 13/00* | (2006.01) | |
| *G02B 27/00* | (2006.01) | |
| *G02B 5/00* | (2006.01) | |

(52) U.S. Cl.
CPC .......... *G02B 9/64* (2013.01); *G02B 13/0045* (2013.01); *G02B 5/005* (2013.01); *G02B 13/18* (2013.01); *G02B 27/0025* (2013.01)

(58) Field of Classification Search
CPC ................ G02B 13/00445; G02B 9/64; G02B 27/0025; G02B 13/18; G02B 5/005
USPC .......................... 359/708, 716, 740, 784, 785
See application file for complete search history.

(56) References Cited

U.S. PATENT DOCUMENTS

| | | | |
|---|---|---|---|
| 2012/0194924 A1 | 8/2012 | Sakai et al. | |
| 2012/0257100 A1 | 10/2012 | Imaoka et al. | |
| 2012/0293879 A1 | 11/2012 | Hayashi et al. | |
| 2013/0033768 A1* | 2/2013 | Sunaga | G02B 9/64 359/786 |
| 2014/0368926 A1* | 12/2014 | Suzuki | G02B 13/006 359/708 |
| 2016/0356985 A1* | 12/2016 | Sun | G02B 9/64 |
| 2016/0356986 A1* | 12/2016 | Sun | G02B 9/64 |

FOREIGN PATENT DOCUMENTS

| | | |
|---|---|---|
| JP | 2012-159613 A | 8/2012 |
| JP | 2012-226309 A | 11/2012 |
| JP | 2012-242472 A | 12/2012 |
| JP | 2012-242689 A | 12/2012 |
| JP | 2013-037080 A | 2/2013 |

* cited by examiner

*Primary Examiner* — Evelyn A Lester
(74) *Attorney, Agent, or Firm* — Studebaker & Brackett PC

(57) ABSTRACT

The imaging lens consists of, in order from the object side, a first lens group having a positive power, a second lens group having a negative power, and a third lens group. The first lens group consists of, in order from the object side, a positive front group, a stop, and a positive rear group. The rear group has a cemented lens consisting of a negative lens concave toward the image side and a positive lens convex toward the image side in order from the object side. The second lens group consists of a negative lens. During focusing, only the second lens group moves. The following conditional expression relating to a focal length f2 of the second lens group and focal length f of the whole system is satisfied: $0.8 < |f2/f| < 5$.

16 Claims, 10 Drawing Sheets

EXAMPLE 1

EXAMPLE 3

EXAMPLE 4

FIG. 5
EXAMPLE 1
INFINITY
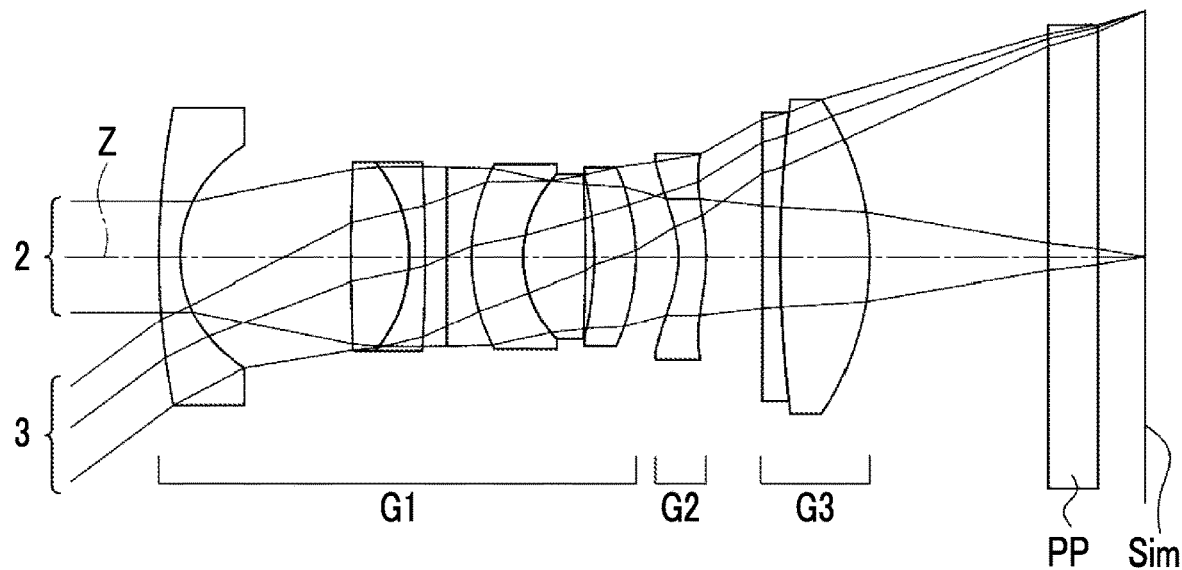
0.4m
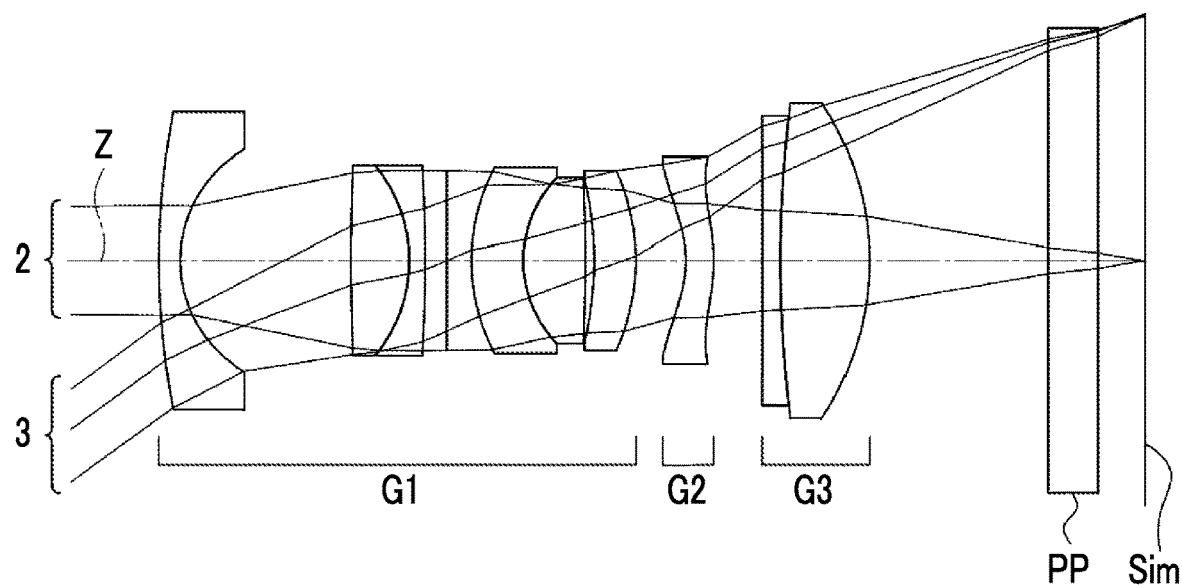

EXAMPLE 1

EXAMPLE 2

IMAGING LENS AND IMAGING APPARATUS

CROSS-REFERENCE TO RELATED APPLICATIONS

The present application claims priority under 35 U.S.C. § 119 to Japanese Patent Application No. 2017-176474, filed on Sep. 14, 2017. The above application is hereby expressly incorporated by reference, in its entirety, into the present application.

BACKGROUND OF THE INVENTION

1. Field of the Invention

The present invention relates to an imaging lens and an imaging apparatus, particularly, relates to an imaging lens suitable for digital cameras, video cameras, and/or the like, and an imaging apparatus comprising the imaging lens.

2. Description of the Related Art

In recent years, an inner focusing system is used in an imaging lens used in an imaging apparatus such as a digital camera. For example, JP2012-159613A, JP2012-226309A, JP2012-242472A, JP2013-37080A, and JP2012-242689A each disclose an imaging lens that has a three-group configuration consisting of a first lens group, a second lens group, and a third lens group and performs focusing by moving the second lens group with respect to the image plane in a state where the first lens group and the third lens group remain stationary with respect to the image plane.

SUMMARY OF THE INVENTION

In the inner focus type imaging lens, in order to increase the autofocus speed and reduce a load on the focus driving system, it is desirable that a lens group (hereinafter referred to as a focus lens group) moving during focusing is configured to be lighter in weight. In the imaging lenses described in JP2012-159613A, JP2012-226309A, JP2012-242472A, JP2013-37080A, and JP2012-242689A, the focus lens group is composed of only one lens.

It is necessary to form the focus lens group with a minimum number of lenses. Further, in order to suppress fluctuation in aberrations caused by movement of the focus lens group, it is necessary to optimize the refractive power of the focus lens group and the configuration of the lens groups disposed on the object side and the image side thereof.

In the imaging lens according to JP2012-159613A, JP2012-226309A, JP2012-242472A, and JP2013-37080A, the third lens group, which is disposed to be closer to the image side than the focus lens group, is composed of only one positive lens. In such a configuration, it is difficult to suppress fluctuation in off-axis rays during focusing. Further, in a case where the third lens group is composed of only the positive lens, it is difficult to suppress fluctuation in chromatic aberration during focusing.

In the imaging lens described in JP2012-242689A, the third lens group is formed of two lenses including a positive lens and a negative lens. However, a refractive power of the second lens group is set to be strong, and thus fluctuation in off-axis rays during focusing becomes large.

The present invention has been made in consideration of the above-mentioned situation, and its object is to provide an inner focus type imaging lens that is capable of high-speed focusing and capable of suppressing fluctuation in aberrations during focusing so as to have favorable optical performance, and an imaging apparatus comprising the imaging lens.

An imaging lens of the present invention consists of, in order from an object side: a first lens group that has a positive refractive power; a second lens group that has a negative refractive power; and a third lens group that has a refractive power. The first lens group consists of, in order from the object side, a front group having a positive refractive power, a stop, and a rear group having a positive refractive power. The front group has at least one negative lens and at least one positive lens. The rear group has a cemented lens consisting of a negative lens concave toward an image side and a positive lens convex toward the image side in order from the object side. The second lens group consists of one negative lens. The third lens group has at least one negative lens and at least one positive lens. During focusing from an object at infinity to a close-range object, the first lens group and the third lens group remain stationary with respect to an image plane, and the second lens group moves from the object side to the image side. Assuming that a focal length of the second lens group is f2 and a focal length of the whole system in a state where the object at infinity is in focus is f, Conditional Expression (1) is satisfied.

$$0.8 < |f2/f| < 5 \qquad (1)$$

It is preferable that the imaging lens of the present invention satisfies Conditional Expression (1-1).

$$1 < |f2/f| < 4 \qquad (1\text{-}1)$$

In the imaging lens of the present invention, assuming that a focal length of the first lens group is f1, it is preferable to satisfy Conditional Expression (2), and it is more preferable to satisfy Conditional Expression (2-1).

$$0.4 < f1/f < 1 \qquad (2)$$

$$0.5 < f1/f < 0.9 \qquad (2\text{-}1)$$

In the imaging lens of the present invention, assuming that a refractive index of the negative lens of the second lens group at a d line is NdG2 and an Abbe number of the negative lens of the second lens group at the d line is vdG2, it is preferable to satisfy Conditional Expressions (3) and (4). Further, it is more preferable to satisfy at least one of Conditional Expressions (3-1) and (4-1) after satisfying Conditional Expressions (3) and (4).

$$1.55 < NdG2 \qquad (3)$$

$$30 < vdG2 < 65 \qquad (4)$$

$$1.55 < NdG2 < 2 \qquad (3\text{-}1)$$

$$32 < vdG2 < 62 \qquad (4\text{-}1)$$

In the imaging lens of the present invention, assuming that a focal length of the third lens group is f3, it is preferable to satisfy Conditional Expression (5), and it is more preferable to satisfy Conditional Expression (5-1).

$$|f2/f3| < 0.67 \qquad (5)$$

$$|f2/f3| < 0.6 \qquad (5\text{-}1)$$

In the imaging lens of the present invention, it is preferable that a negative lens is disposed to be closest to the object side in the front group. Further, it is preferable that the front group consists of a negative lens, which is disposed to be closest to the object side, and a front group sub-lens group which is disposed to be separated by an air gap from the negative lens and has a positive refractive power.

In the imaging lens of the present invention, it is preferable that the rear group has at least one aspheric surface.

In the imaging lens of the present invention, it is preferable that the third lens group consists of one negative lens and one positive lens. In this case, it is preferable that the third lens group consists of, in order from the object side, one negative lens and one positive lens. Further, in the imaging lens of the present invention, the third lens group may be configured to have a positive refractive power.

An imaging apparatus of the present invention comprises the imaging lens of the present invention.

In the present description, it should be noted that the terms "consisting of ~" and "consists of ~" are used in a substantial sense, and mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the "~ group having a positive refractive power" means that the group has a positive refractive power as a whole. Likewise, the "~ group having a negative refractive power" means that the group has a negative refractive power as a whole. Signs of refractive powers and surface shapes of the lenses are assumed as those in paraxial regions in a case where some lenses have aspheric surfaces. The "lens group" is not necessarily composed of a plurality of lenses, but may be composed of only one lens. The number of lenses mentioned above is the number of lenses formed as the elements. For example, the number of lenses of the cemented lens, in which a plurality of single lenses having different materials is cemented, indicates the number of single lenses constituting the cemented lens. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. All the above-mentioned conditional expressions are based on the d line (a wavelength of 587.6 nm (nanometers)).

According to the present invention, the imaging lens consists of, in order from the object side, a first lens group having a positive power, a second lens group having a negative power, and a third lens group. In a lens system in which only the second lens group moves during focusing, a configuration of each lens group is appropriately set such that predetermined conditional expressions are further satisfied. Therefore, it is possible to provide an inner focus type imaging lens that is capable of high-speed focusing and capable of suppressing fluctuation in aberrations during focusing so as to have favorable optical performance, and an imaging apparatus comprising the imaging lens.

BRIEF DESCRIPTION OF THE DRAWINGS

FIG. 5 is a cross-sectional view illustrating optical paths of the imaging lens shown in FIG. 1.

DESCRIPTION OF THE PREFERRED EMBODIMENTS

Hereinafter, embodiments of the present invention will be described with reference to drawings. FIGS. 1 to 4 are cross-sectional views illustrating configurations of imaging lenses according to an embodiment of the present invention, and respectively correspond to Examples 1 to 4 to be described later. FIGS. 1 to 4 show situations where an object at infinity is in focus, the left side thereof is an object side, and the right side thereof is an image side. Further, FIG. 5 is an optical path diagram of the imaging lens shown in FIG. 1, and shows a lens configuration thereof and on-axis rays 2 and rays with the maximum angle of view 3. In FIG. 5, a state where an object at infinity is in focus is shown in the upper part labeled as "infinity", and a state where a close-range object having an object distance of "0.4 m" is in focus is shown in the lower part labeled as "0.4 m (meters)". Basic configurations and illustration methods of examples shown in FIGS. 1 to 4 are the same, and will be hereinafter described with reference to mainly the example shown in FIG. 1.

This imaging lens consists of, in order from the object side to the image side along an optical axis Z: a first lens group G1 that has a positive refractive power as a whole; a second lens group G2 that has a negative refractive power as a whole; and a third lens group G3 that has a refractive power. In the example shown in FIG. 1, the first lens group G1 consists of, in order from the object side, six lenses, that is, lenses L11 to L16, the second lens group G2 consists of only one lens, that is, a lens L21, and the third lens group G3 consists of, in order from the object side, two lenses, that is, lenses L31 and L32.

Figure 1:
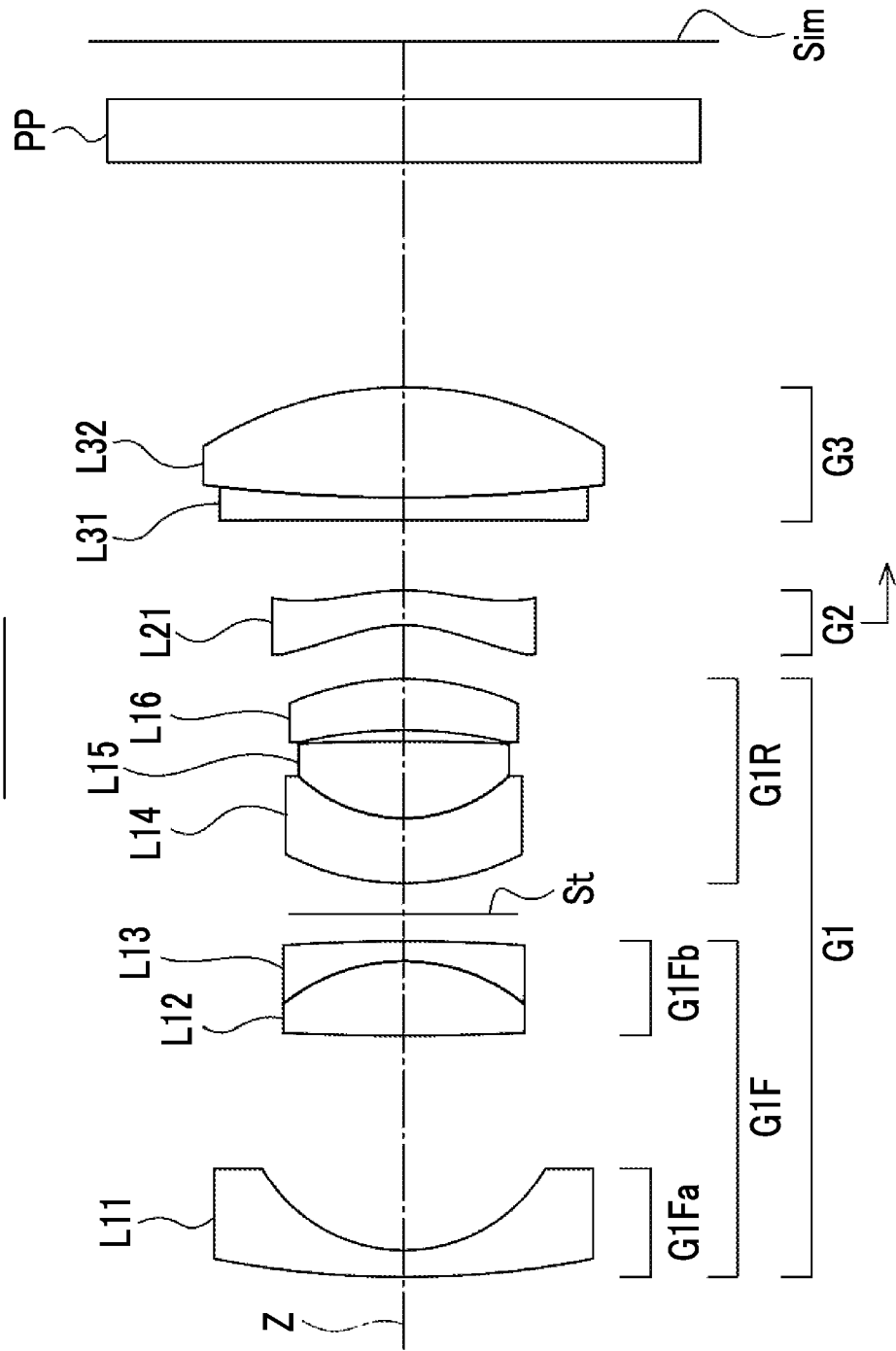
FIG. 1 is a cross-sectional view illustrating a configuration of an imaging lens of Example 1 of the present invention.

FIG. 1 shows an example in which an optical member PP having a plane parallel plate shape is disposed between the lens system and the image plane Sim. The optical member PP is assumed to be an infrared cut filter, a low pass filter, various other filters, a cover glass, and/or the like. In the present invention, the optical member PP may be disposed at a position different from that in the example of FIG. 1, or the optical member PP may be omitted.

The imaging lens is configured such that, during focusing from an object at infinity to a close-range object, the first lens group G1 and the third lens group G3 remain stationary with respect to the image plane Sim, and the second lens group G2 is moved from the object side to the image side. Further, the second lens group G2 is configured to consist of only one negative lens. The arrow under the second lens group G2 of FIG. 1 indicates a direction in which the second lens group G2 move during focusing from the object at infinity to the close-range object.

By employing an inner focusing system, it is possible to reduce a load to a system in which a focus lens unit is driven, and it is possible to reduce a size of the focus lens unit. As a result, it is possible to reduce a size of the whole lens system. In order to cope with the demand for reduction in size of the imaging apparatus, there is also a demand for reduction in size of the lens system. Further, by adopting a configuration in which the focus lens group is composed of one lens, it is possible to achieve reduction in weight thereof, and it is possible to achieve high-speed focusing. Furthermore, by making the reference signs of a refractive power of the second lens group G2 as the focus lens group and a refractive power of the first lens group G1 different from each other, it is possible to make the refractive power of the focus lens group strong, and it is possible to decrease an amount of movement of the focus lens group during focusing.

The third lens group G3 is configured to have at least one negative lens and at least one positive lens. By arranging the positive lens and the negative lens in the third lens group G3, there is an advantage in correcting chromatic aberration and field curvature.

The imaging lens is configured such that the focal length of the second lens group G2 satisfies Conditional Expression (1).

$$0.8<|f2/f|<5 \qquad (1)$$

Here, f2 is a focal length of the second lens group, and f is a focal length of the whole system in a state where the object at infinity is in focus.

By not allowing the result of the conditional expression (1) to be equal to or less than the lower limit, the refractive power of the second lens group G2 is prevented from becoming excessively strong. Thus, it is possible to satisfactorily perform aberration correction even in a case where the second lens group G2 is composed of one lens. In particular, this is advantageous in suppressing occurrence of field curvature. Further, it is possible to increase the tolerance of the eccentricity error of the focus lens group which is a movable part. As a result, it becomes easier to realize favorable performance. By not allowing the result of the conditional expression (1) to be equal to or greater than the upper limit, it is possible to minimize the amount of movement of the second lens group G2 during focusing. As a result, there is an advantage in reducing the size of the whole lens system and increasing the speed of focusing. In order to enhance the effect relating to Conditional Expression (1), it is more preferable to satisfy Conditional Expression (1-1).

$$1<|f2/f|<4 \qquad (1-1)$$

The first lens group G1 consists of, in order from the object side, a front group G1F that has a positive refractive power as a whole, an aperture stop St, and a rear group G1R that has a positive refractive power as a whole. In the example shown in FIG. 1, the front group G1F consists of lenses L11 to L13, and the rear group G1R consists of lenses L14 to L16. It should be noted that the aperture stop St shown in FIG. 1 does not necessarily indicate its sizes and/or shapes, and indicates a position of the aperture stop St on the optical axis Z.

By forming the front group G1F, which is a lens group closest to the object side, as a lens group having a positive refractive power, it is possible to shorten a total length of the lens system. The aperture stop St may be disposed between the lenses constituting the first lens group G1, and positions of the lens closest to the object side and the aperture stop St may be set to be close to each other, whereby it is possible to reduce a diameter of the lens closest to the object side.

The front group G1F is configured to have at least one negative lens and at least one positive lens. By arranging the positive lens and the negative lens in the front group G1F, there is an advantage in correcting chromatic aberration and field curvature. It is preferable that the negative lens is disposed to be closest to the object side in the front group G1F. By arranging the negative lens such that it is closest to the object side, it is possible to achieve the wide angle without increasing the diameter of the lens closest to the object side.

The front group G1F may be configured to consist of a front group Fa sub-lens group G1Fa, which consists of one negative lens disposed to be closest to the object side, and a front group Fb sub-lens group G1Fb which is disposed to be separated by an air gap from the negative lens and has a positive refractive power as a whole. With such a configuration, the front group G1F serves as a wide converter, and thus it is possible to achieve the wide angle while correcting distortion or coma aberration.

In a case where the front group G1F is configured to consist of the front group Fa sub-lens group G1Fa and the front group Fb sub-lens group G1Fb, the front group Fb sub-lens group G1Fb may be a cemented lens that is formed by cementing one positive lens and one negative lens. In such a case, by providing the cemented lens separately from the negative lens closest to the object side, it is possible to correct chromatic aberration.

The rear group G1R is configured to have a cemented lens consisting of a negative lens concave toward the image side and a positive lens convex toward the image side in order from the object side. By arranging the positive lens and the negative lens in the rear group G1R, there is an advantage in correcting chromatic aberration and field curvature. Further, since the rear group G1R has a cemented lens consisting of two lenses, it is possible to shorten the total length of the lens system while correcting chromatic aberration using the minimum number of lenses that is capable to composing the cemented lens.

The second lens group G2 consists of one negative lens. It is preferable that the negative lens composing the second lens group G2 is an aspheric lens including at least one aspheric surface. In this case, fluctuation in field curvature during focusing can be suppressed. Furthermore, in a case where both surfaces on the object side and the image side of the negative lens composing the second lens group G2 are aspheric, it is possible to more satisfactorily suppress the fluctuation in field curvature.

The rear group G1R also preferably has at least one aspheric surface. In a case where the second lens group G2 is composed of an aspheric lens and has a function of suppressing fluctuation in field curvature during focusing, field curvature, which remains after being corrected by the second lens group G2, can be corrected by the aspheric surface of the rear group G1R. Further, the rear group G1R has a cemented lens formed by cementing a negative lens concave toward the image side and a positive lens convex toward the image side in order from the object side, and includes an aspheric surface. Thereby, it is possible to satisfactorily correct chromatic aberration and field curvature while reducing the size of the lens system with a small number of lenses.

The third lens group G3 may be a lens group having a positive refractive power, and may be a lens group having a negative refractive power. However, in a case where the third lens group G3 is formed as a lens group having a positive refractive power, by separating an exit pupil position from the image plane Sim, it is possible to decrease an angle of incidence of rays which is incident on the image plane Sim. As a result, in a case where a solid-state imaging device is disposed at a position of the image plane Sim of the imaging lens, this configuration is advantageous in favorable image acquisition. Further, in a case where the third lens group G3 is formed as a lens group having a positive refractive power, reference signs of the refractive power of the third lens group G3 and the refractive power of the second lens group G2 as the focus lens group are different. Thus, it is possible to increase the refractive power of the focus lens group, and it is possible to decrease an amount of movement of the focus lens group during focusing.

The third lens group G3 may be configured to consist of one negative lens and one positive lens. By making the third lens group G3 include the two lenses and arranging the positive lens and the negative lens, there is an advantage in correcting chromatic aberration and field curvature. At that time, the third lens group G3 may be configured to consist of, in order from the object side, one negative lens and one positive lens. In such a case of using an arrangement order, it is possible to decrease the angle of incidence of rays which are incident on the image plane Sim. Further, in a case where the third lens group G3 consists of one negative lens and one positive lens, these two lenses may be cemented to each other. In addition, in a case where the lenses are cemented, there is an advantage in correcting chromatic aberration.

Next, preferred configurations relating to conditional expressions will be described. It is preferable that the imaging lens satisfies at least one or an optional combination of Conditional Expressions (2) to (5).

$$0.4 < f1/f < 1 \tag{2}$$

$$1.55 < NdG2 \tag{3}$$

$$30 < vdG2 < 65 \tag{4}$$

$$|f2/f3| < 0.67 \tag{5}$$

Here, f1 is a focal length of the first lens group,
f is a focal length of the whole system in a state where the object at infinity is in focus,
NdG2 is a refractive index of the negative lens of the second lens group at the d line,
vdG2 is an Abbe number of the negative lens of the second lens group at the d line,
f2 is a focal length of the second lens group, and
f3 is a focal length of the third lens group.

By not allowing the result of the conditional expression (2) to be equal to or less than the lower limit, the refractive power of the first lens group G1 is prevented from becoming excessively strong, and thus there is an advantage in correcting spherical aberration and coma aberration occurring in the first lens group G1. By not allowing the result of the conditional expression (2) to be equal to or greater than the upper limit, the refractive power of the first lens group G1 is prevented from becoming excessively weak, and thus there is an advantage in reducing the size of the optical system. In order to enhance the effect relating to Conditional Expression (2), it is more preferable that Conditional Expression (2-1) is satisfied.

$$0.5 < f1/f < 0.9 \tag{2-1}$$

By not allowing the result of the conditional expression (3) to be equal to or less than the lower limit, it is possible to increase a proportion of an amount of movement of an image plane position to the amount of movement of the focus lens group in the optical axis direction while minimizing aberrations.

By not allowing the result of the conditional expression (4) to be equal to or less than the lower limit, it is possible to suppress fluctuation in chromatic aberration caused by movement of the focus lens group. By not allowing the result of the conditional expression (4) to be equal to or greater than the upper limit, there is an advantage in correcting lateral chromatic aberration caused by the first lens group G1. In order to enhance the effect relating to Conditional Expression (4), it is more preferable that Conditional Expression (4-1) is satisfied.

$$32 < vdG2 < 62 \tag{4-1}$$

In the configuration of the focus lens group, it is preferable that Conditional Expressions (3) and (4) are satisfied, and it is more preferable that Conditional Expressions (3) and (4-1) are satisfied. In addition, in order to use an optical material which satisfies Conditional Expressions (3) and (4), it is preferable that Conditional Expression (3-1) is satisfied.

$$1.55 < NdG2 < 2 \tag{3-1}$$

By not allowing the result of Conditional Expression (5) to be equal to or greater than the upper limit, the refractive power of the third lens group G3 is prevented from becoming excessively strong. As a result, it is possible to minimize change in off-axis rays during focusing. Accordingly, it is possible to suppress fluctuation in field curvature during focusing. Further, by not allowing the result of Conditional Expression (5) to be equal to or greater than the upper limit, the refractive power of the second lens group G2 as the focus lens group is prevented from becoming excessively weak, and thus there is an advantage in a decrease in amount of movement of the focus lens group. The lower limit of |f2/f3| is represented by $0 \leq |f2/f3|$. In order to enhance the effect of Conditional Expression (5), it is preferable that Conditional Expression (5-1) is satisfied.

$$|f2/f3| < 0.6 \tag{5-1}$$

The above-mentioned preferred configurations and available configurations may be optional combinations, and it is preferable to selectively adopt the configurations in accordance with required specification.

Next, numerical examples of the imaging lens of the present invention will be described.

Example 1

A lens configuration of an imaging lens of Example 1 is shown in FIG. 1, and an illustration method thereof is as described above. Therefore, repeated description is partially omitted herein. The imaging lens of Example 1 consists of, in order from the object side to the image side: a first lens group G1 that has a positive refractive power; a second lens group G2 that has a negative refractive power; and a third lens group G3 that has a positive refractive power. The first lens group G1 consists of, in order from the object side to the image side, a front group G1F that has a positive refractive power, an aperture stop St, and a rear group G1R that has a positive refractive power. The front group G1F consists of, in order from the object side to the image side, a front group Fa sub-lens group G1Fa and a front group Fb sub-lens group G1Fb that has a positive refractive power. During focusing from the object at infinity to the close-range object, the first lens group G1 and the third lens group G3 remain stationary with respect to the image plane Sim, and the second lens group G2 moves from the object side to the image side. The outline of the imaging lens of Example 1 has been described above.

The front group Fa sub-lens group G1Fa consists of one lens L11. The front group Fb sub-lens group G1Fb consists of two lenses L12 and L13. The rear group G1R consists of three lenses L14 to L16. The second lens group G2 consists of one lens L21. The third lens group G3 consists of two lenses L31 and L32. The lens L12 and the lens L13 are cemented to each other. The lens L14 and the lens L15 are cemented to each other. The lens L31 and the lens L32 are cemented to each other. The other lenses are single lenses which are not cemented.

Table 1 shows basic lens data of the imaging lens of Example 1, Table 2 shows specification and variable surface distances, and Table 3 shows aspheric surface coefficients thereof. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the respective components at the d line (a wavelength of 587.6 nm (nanometers)), and the column of νd shows Abbe numbers of the respective components at the d line.

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

In Table 2, the values of the focal length f of the whole system in a state where the object at infinity is in focus, the focal length fnear of the whole system in a state where an object having an object distance of 0.4 m (meters) is in focus, and the back focal length Bf of the whole system at the air conversion distance in the state where the object at infinity is in focus are based on the d line. In Table 2, values of the F number FNo., the maximum total angle of view 2ω, and the variable surface distance in the state where the object at infinity is in focus and the state where the object having the object distance of 0.4 m (meters) is in focus are based on the d line. (°) in the place of 2ω indicates that the unit thereof is a degree. In Table 2, the column denoted by the "infinity" shows respective values thereof in a state where the object at infinity is in focus, and the column denoted by "0.4 m" shows respective values thereof in a state where an object at an object distance of 0.4 m (meters) is in focus.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{±n}$". The aspheric surface coefficients are values of the coefficients KA and Am (m=3, 4, 5, ... ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | νd |
|---|---|---|---|---|
| 1 | 45.49536 | 1.196 | 1.48749 | 70.24 |
| 2 | 7.47068 | 9.592 | | |
| 3 | 132.64967 | 3.267 | 1.88300 | 40.76 |
| 4 | −8.74260 | 0.896 | 1.66680 | 33.05 |
| 5 | −83.60663 | 1.194 | | |
| 6 (St) | ∞ | 1.400 | | |
| 7 | 11.74140 | 2.900 | 1.77250 | 49.60 |
| 8 | 6.96123 | 3.436 | 1.49700 | 81.61 |
| 9 | −100.32361 | 0.499 | | |
| *10 | −18.66232 | 2.286 | 1.58313 | 59.38 |
| *11 | −11.28556 | DD[11] | | |
| *12 | −6.24991 | 1.548 | 1.80610 | 40.73 |
| *13 | −10.50784 | DD[13] | | |
| 14 | −1495.57928 | 0.999 | 1.89286 | 20.36 |
| 15 | 72.79315 | 4.970 | 1.48749 | 70.24 |
| 16 | −16.80658 | 10.000 | | |
| 17 | ∞ | 2.800 | 1.51680 | 64.20 |
| 18 | ∞ | 2.593 | | |

TABLE 2

Example 1

| | Infinity | 0.4 m |
|---|---|---|
| f | 18.501 | — |
| fnear | — | 18.257 |
| Bf | 14.439 | — |
| FNo. | 2.89 | 2.90 |
| 2ω (°) | 74.8 | 74.0 |
| DD[11] | 2.393 | 2.809 |
| DD[13] | 3.158 | 2.742 |

TABLE 3

Example 1

| | Surface Number | | | |
|---|---|---|---|---|
| | 10 | 11 | 12 | 13 |
| KA | 0.0000000E+00 | 0.0000000E+00 | 0.0000000E+00 | 0.0000000E+00 |
| A3 | 4.7673684E−04 | 1.2073552E−04 | 1.5344417E−03 | 1.9418523E−03 |
| A4 | −1.4458765E−04 | 4.9325509E−04 | 5.6463000E−04 | −4.6478728E−04 |
| A5 | 2.3455783E−04 | −2.7510162E−04 | 4.4267606E−04 | 9.2661157E−04 |
| A6 | −7.9871867E−05 | 2.5263317E−04 | 2.2549780E−04 | −9.1963541E−05 |
| A7 | −5.7626974E−05 | −2.5731689E−04 | −5.3003708E−04 | −2.4289451E−04 |
| A8 | 1.3977004E−04 | 2.6151934E−04 | 5.2119294E−04 | 2.5310387E−04 |
| A9 | −1.5304040E−04 | −2.2753489E−04 | −4.0305249E−04 | −1.7874464E−04 |
| A10 | 1.1221689E−04 | 1.5501455E−04 | 2.5356067E−04 | 1.0173268E−04 |
| A11 | −6.1421251E−05 | −8.1558324E−05 | −1.2569026E−04 | −4.6118613E−05 |
| A12 | 2.6468350E−05 | 3.3358109E−05 | 4.8485442E−05 | 1.6375258E−05 |
| A13 | −9.0735640E−06 | −1.0655138E−05 | −1.4562763E−05 | −4.5341765E−06 |
| A14 | 2.4374771E−06 | 2.6505243E−06 | 3.4021844E−06 | 9.7588818E−07 |
| A15 | −5.0218636E−07 | −5.0790474E−07 | −6.1250365E−07 | −1.6169980E−07 |
| A16 | 7.7599056E−08 | 7.3458215E−08 | 8.3271176E−08 | 2.0224158E−08 |
| A17 | −8.7312695E−09 | −7.7486566E−09 | −8.2567388E−09 | −1.8453215E−09 |
| A18 | 6.7886960E−10 | 5.6208317E−10 | 5.6280803E−10 | 1.1582217E−10 |
| A19 | −3.2721529E−11 | −2.5050335E−11 | −2.3564987E−11 | −4.4683001E−12 |
| A20 | 7.3673275E−13 | 5.1677388E−13 | 4.5686362E−13 | 7.9845279E−14 |

Figure 6:
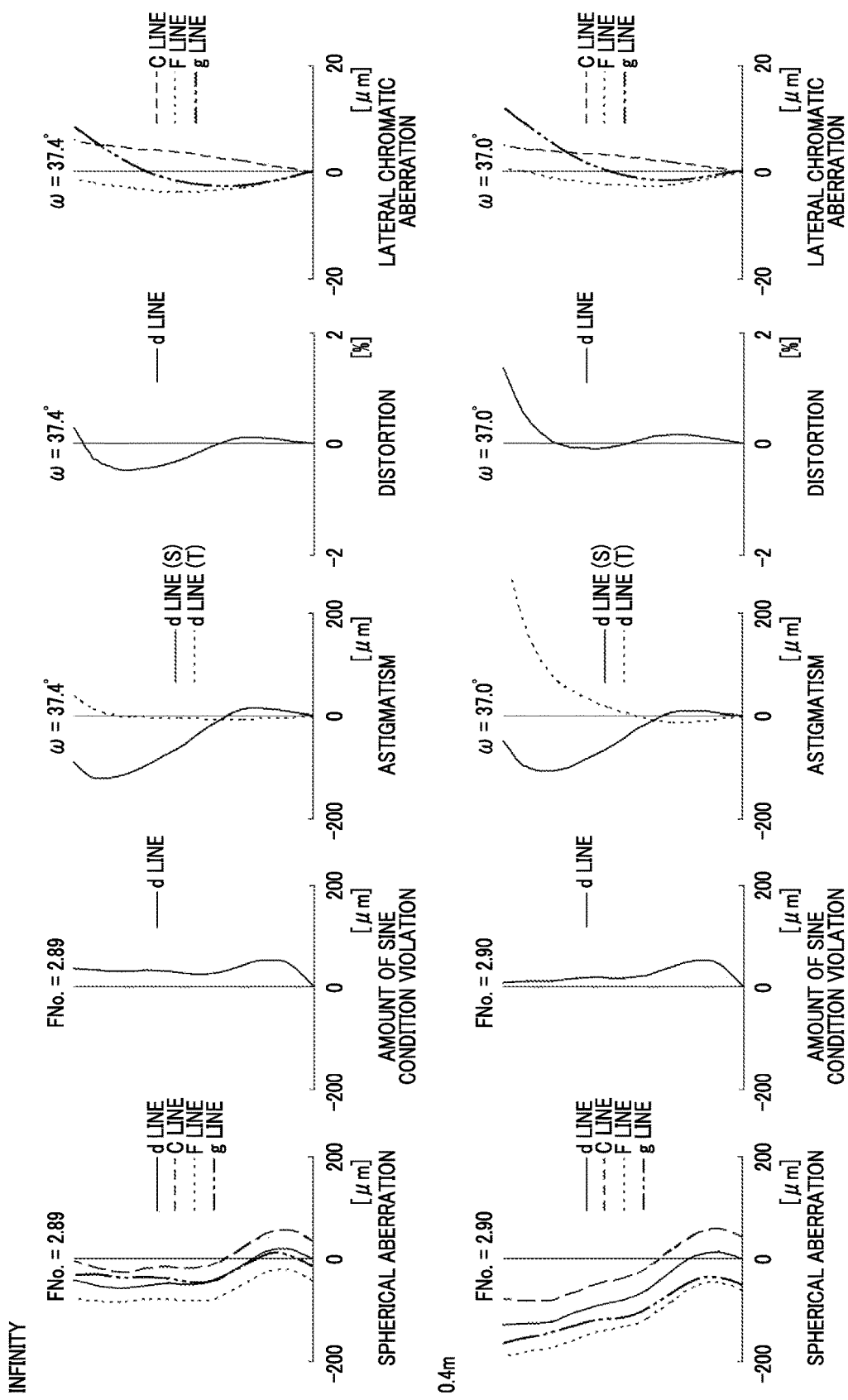
FIG. 6 is a diagram of aberrations of the imaging lens of Example 1 of the present invention.

FIG. 6 shows a diagram of aberrations of the imaging lens of Example 1. FIG. 6 shows spherical aberrations, amounts of sine condition violation, astigmatisms, distortions, and lateral chromatic aberrations are shown in order from the left side. In FIG. 6, a state where an object at infinity is in focus is shown in the upper part labeled as "infinity", and a state where an object having an object distance of "0.4 m" is in focus is shown in the lower part labeled as "0.4 m (meters)". In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the black solid line, the long dashed line, the short dashed line, and the chain double-dashed line. In the diagram of the amount of sine condition violation and the distortion diagram, aberration at the d line is indicated by the solid line. In the astigmatism diagram, aberration in the sagittal direction at the d line is indicated by the solid line, and aberration in the tangential direction at the d line is indicated by the short dashed line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

The symbols, the meanings, the description method, and the illustration method of each data relating to the above-mentioned imaging lens of Example 1 are the same in Examples unless otherwise specified. Therefore, repeated examples will be omitted below.

Example 2

Figure 2:
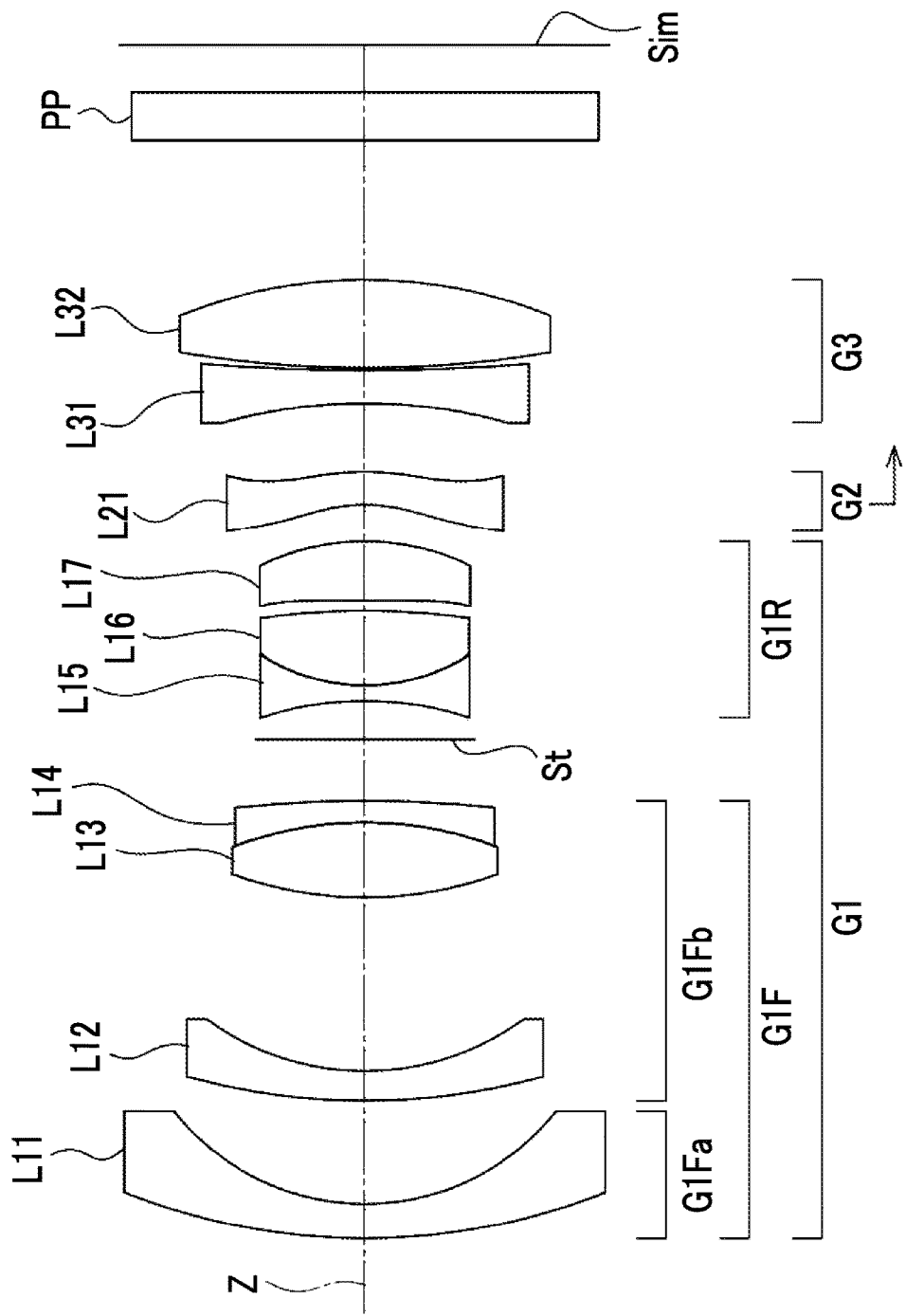
FIG. 2 is a cross-sectional view illustrating a configuration of an imaging lens of Example 2 of the present invention.
Figure 7:
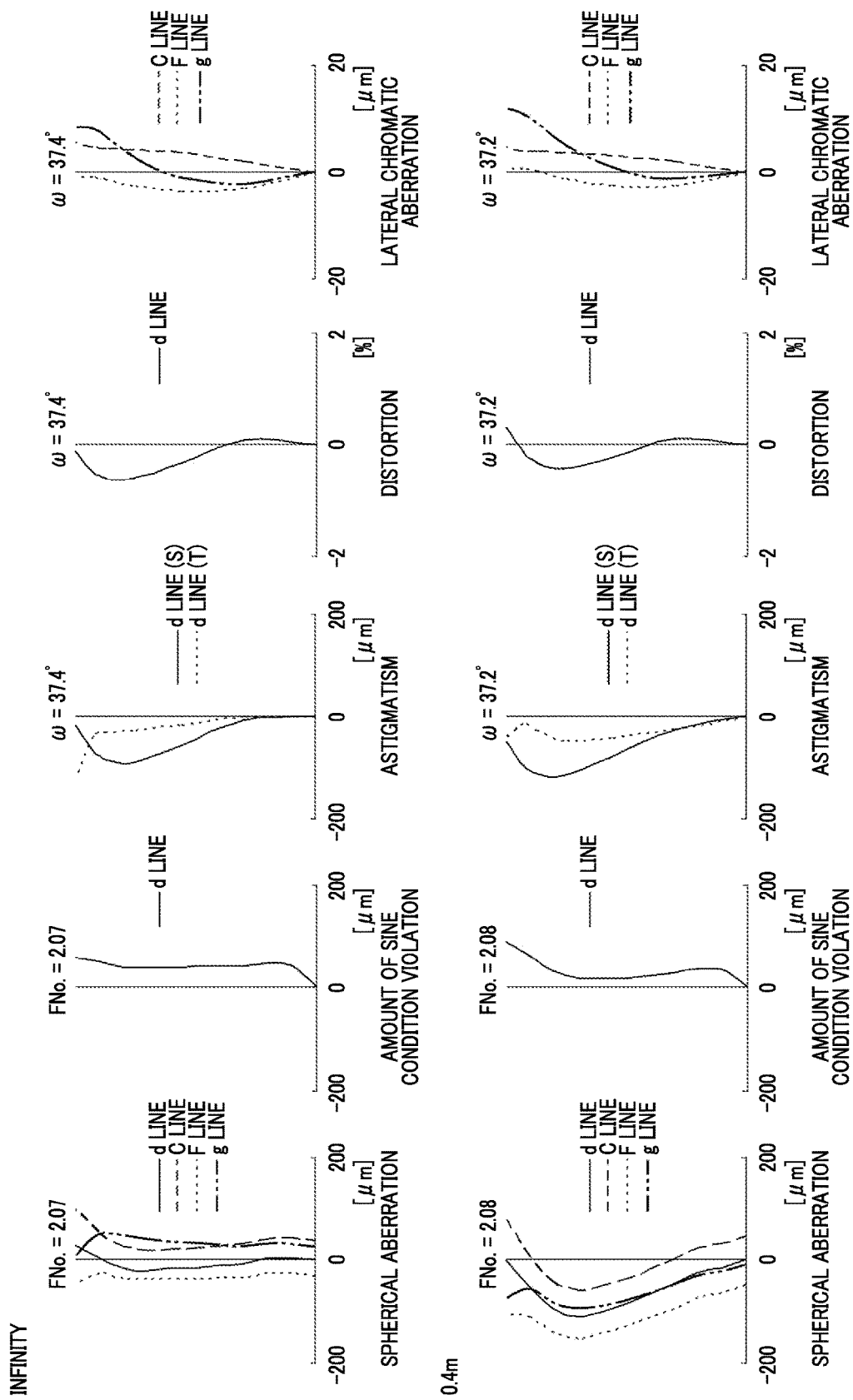
FIG. 7 is a diagram of aberrations of the imaging lens of Example 2 of the present invention.

FIG. 2 shows a lens configuration of an imaging lens of Example 2. The imaging lens of Example 2 has the same configuration as that of the imaging lens of Example 1. The front group Fa sub-lens group G1Fa consists of one lens L11. The front group Fb sub-lens group G1Fb consists of three lenses L12 to L14. The rear group G1R consists of three lenses L15 to L17. The second lens group G2 consists of one lens L21. The third lens group G3 consists of two lenses L31 and L32. The lens L13 and the lens L14 are cemented to each other. The lens L15 and the lens L16 are cemented to each other. The other lenses are single lenses which are not cemented. Table 4 shows basic lens data of the imaging lens of Example 2, Table 5 shows specification and variable surface distances, Table 6 shows aspheric surface coefficients, and FIG. 7 shows aberration diagrams.

TABLE 4

Example 2

| Surface Number | R | D | Nd | νd |
|---|---|---|---|---|
| 1 | 38.06788 | 1.988 | 1.51680 | 64.20 |
| 2 | 14.20690 | 5.934 | | |
| 3 | 39.55777 | 1.691 | 1.49700 | 81.61 |
| 4 | 15.67577 | 9.992 | | |
| 5 | 22.70448 | 4.306 | 1.88300 | 40.76 |
| 6 | −21.54851 | 1.238 | 1.75211 | 25.05 |
| 7 | −70.96819 | 3.514 | | |
| 8 (St) | ∞ | 2.219 | | |
| 9 | −19.61047 | 0.898 | 1.60342 | 38.03 |
| 10 | 11.14175 | 4.250 | 1.64000 | 60.08 |
| 11 | −43.93048 | 0.578 | | |
| *12 | −719.59768 | 3.393 | 1.76450 | 49.10 |
| *13 | −14.90235 | DD[13] | | |
| *14 | −8.78969 | 1.906 | 1.80610 | 40.73 |
| *15 | −13.83780 | DD[15] | | |
| 16 | −30.14759 | 1.898 | 1.84666 | 23.78 |
| 17 | 124.85824 | 0.132 | | |
| 18 | 64.76200 | 5.050 | 1.85150 | 40.78 |
| 19 | −29.32555 | 8.000 | | |
| 20 | ∞ | 2.800 | 1.51680 | 64.20 |
| 21 | ∞ | 2.693 | | |

TABLE 5

Example 2

| | Infinity | 0.4 m |
|---|---|---|
| f | 18.627 | — |
| fnear | — | 18.336 |
| Bf | 12.539 | — |
| FNo. | 2.07 | 2.08 |
| 2ω (°) | 74.8 | 74.4 |

TABLE 5-continued

Example 2

|  | Infinity | 0.4 m |
|---|---|---|
| DD[13] | 2.154 | 2.698 |
| DD[15] | 3.958 | 3.414 |

TABLE 6

Example 2

Surface Number

|  | 12 | 13 | 14 | 15 |
|---|---|---|---|---|
| KA | 0.0000000E+00 | 0.0000000E+00 | 0.0000000E+00 | 0.0000000E+00 |
| A3 | 4.9559277E−04 | −1.0416337E−04 | −6.0564423E−05 | 8.4238914E−04 |
| A4 | −5.9306940E−04 | 1.3870281E−04 | 7.3532026E−04 | −2.9024247E−04 |
| A5 | 2.2240816E−04 | −1.7143128E−04 | 1.7601380E−04 | 5.4577660E−04 |
| A6 | −1.7321939E−05 | 7.9668894E−05 | −1.2269413E−04 | −1.3091175E−04 |
| A7 | −3.1437967E−05 | −4.5201255E−06 | 3.3437465E−05 | −1.5469751E−05 |
| A8 | 1.1305927E−05 | −1.5317544E−05 | −1.6296313E−07 | 1.6882054E−05 |
| A9 | 7.2750776E−07 | 9.4766236E−06 | −2.5504720E−06 | −4.0287859E−06 |
| A10 | −1.0859241E−06 | −3.7036848E−06 | 6.8715294E−07 | 5.2790409E−07 |
| A11 | 1.0456371E−07 | 1.3391887E−06 | −7.4594054E−08 | −1.3678808E−07 |
| A12 | 4.7516721E−08 | −4.4634727E−07 | 7.0671981E−09 | 5.1153129E−08 |
| A13 | −9.2539700E−09 | 1.1736222E−07 | −2.7632889E−09 | −1.1067341E−08 |
| A14 | −8.6614756E−10 | −2.2739213E−08 | 7.0692737E−10 | 1.3558797E−09 |
| A15 | 3.0472556E−10 | 3.2757122E−09 | −8.6496388E−11 | −1.0740143E−10 |
| A16 | 1.1851470E−12 | −3.6192125E−10 | 4.9975128E−12 | 8.0807111E−12 |
| A17 | −5.0141882E−12 | 3.0560721E−11 | −1.2212460E−13 | −6.8825761E−13 |
| A18 | 2.1851128E−13 | −1.8006678E−12 | 7.7725290E−15 | 3.6705975E−14 |
| A19 | 3.1308246E−14 | 5.9847929E−14 | −9.9911079E−16 | −3.5355871E−16 |
| A20 | −2.2040173E−15 | −6.7011362E−16 | 3.7621798E−17 | −2.8476561E−17 |

Example 3

Figure 3:
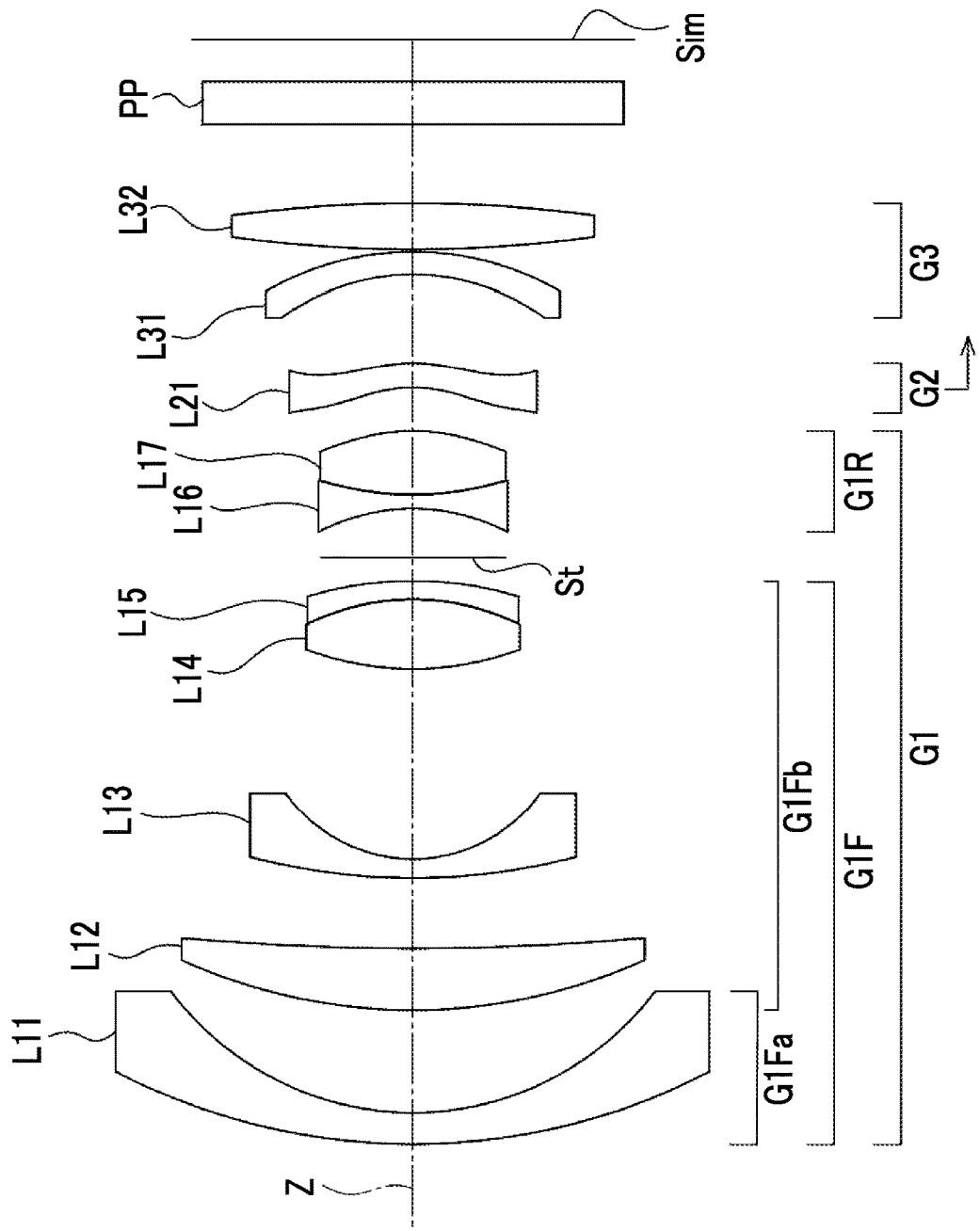
FIG. 3 is a cross-sectional view illustrating a configuration of an imaging lens of Example 3 of the present invention.
Figure 8:
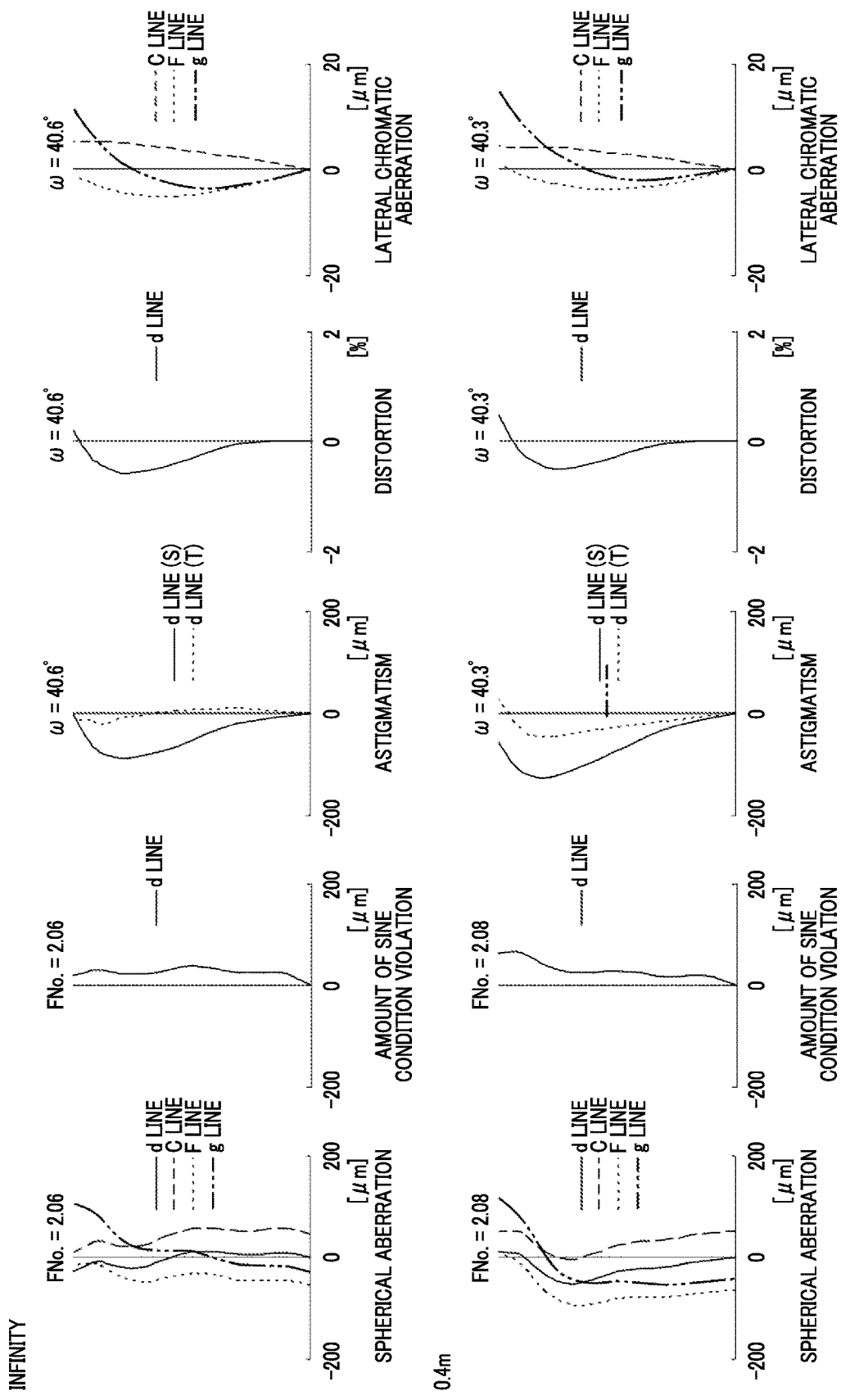
FIG. 8 is a diagram of aberrations of the imaging lens of Example 3 of the present invention.

FIG. 3 shows a lens configuration of an imaging lens of Example 3. The imaging lens of Example 3 has the same configuration as the outline of the imaging lens of Example 1. The front group Fa sub-lens group G1Fa consists of one lens L11. The front group Fb sub-lens group G1Fb consists of four lenses L12 to L15. The rear group G1R consists of two lenses L16 and L17. The second lens group G2 consists of one lens L21. The third lens group G3 consists of two lenses L31 and L32. The lens L14 and the lens L15 are cemented together. The lens L16 and the lens L17 are cemented to each other. The other lenses are single lenses which are not cemented. Table 7 shows basic lens data of the imaging lens of Example 3, Table 8 shows specification and variable surface distances, Table 9 shows aspheric surface coefficients, and FIG. 8 shows aberration diagrams.

TABLE 7

Example 3

| Surface Number | R | D | Nd | vd |
|---|---|---|---|---|
| 1 | 42.01378 | 1.999 | 1.80400 | 46.58 |
| 2 | 19.63889 | 6.517 |  |  |
| 3 | 36.66391 | 3.914 | 1.90366 | 31.34 |
| 4 | 164.79785 | 4.452 |  |  |
| 5 | 41.71019 | 1.199 | 1.49700 | 81.61 |
| 6 | 10.07540 | 12.149 |  |  |
| 7 | 20.05162 | 4.439 | 1.74100 | 52.64 |
| 8 | −15.65457 | 1.176 | 1.84666 | 23.78 |
| 9 | −24.08319 | 1.504 |  |  |
| 10 (St) | ∞ | 3.084 |  |  |
| 11 | −13.30426 | 0.897 | 1.67270 | 32.10 |
| 12 | 20.50802 | 4.031 | 1.80139 | 45.45 |
| *13 | −13.02611 | DD[13] |  |  |
| *14 | −7.97787 | 1.546 | 1.69350 | 53.20 |
| *15 | −10.93142 | DD[15] |  |  |
| 16 | −14.63041 | 1.451 | 1.94595 | 17.98 |
| 17 | −19.20114 | 0.149 |  |  |
| 18 | 88.00000 | 2.920 | 1.91082 | 35.25 |
| 19 | −88.00000 | 5.000 |  |  |
| 20 | ∞ | 2.800 | 1.51680 | 64.20 |
| 21 | ∞ | 2.632 |  |  |

TABLE 8

Example 3

|  | Infinity | 0.4 m |
|---|---|---|
| f | 16.508 | — |
| fnear | — | 16.291 |
| Bf | 9.478 | — |
| FNo. | 2.06 | 2.08 |
| 2ω (°) | 81.2 | 80.6 |
| DD[13] | 2.790 | 3.534 |
| DD[15] | 5.594 | 4.850 |

TABLE 9

Example 3

| | Surface Number | | |
|---|---|---|---|
| | 13 | 14 | 15 |
| KA | 0.0000000E+00 | 0.0000000E+00 | 0.0000000E+00 |
| A3 | −3.4905723E−04 | −9.9904822E−06 | 7.2942655E−04 |
| A4 | 4.8059813E−04 | 8.6604579E−04 | −1.6081357E−04 |
| A5 | −2.9872044E−04 | 8.4755805E−05 | 5.3756316E−04 |
| A6 | 1.0761867E−04 | −1.0025971E−04 | −1.5086178E−04 |
| A7 | −5.9274075E−06 | 3.9653127E−05 | −4.8018892E−06 |
| A8 | −9.3636659E−06 | −4.2052850E−06 | 1.3264134E−05 |
| A9 | 2.5929584E−06 | −1.6042886E−06 | −2.1579041E−06 |
| A10 | 1.5846999E−07 | 5.1165866E−07 | −3.1559450E−07 |
| A11 | −1.5273453E−07 | −1.6995265E−08 | 1.1338241E−07 |
| A12 | 1.0113606E−08 | −1.3538768E−08 | −1.2587904E−09 |
| A13 | 3.6770685E−09 | 1.8635636E−09 | −2.3580736E−09 |
| A14 | −3.9153331E−10 | 1.0428060E−10 | 1.4144475E−10 |
| A15 | −6.8912172E−11 | −3.7906349E−11 | 2.6975308E−11 |
| A16 | 1.0130980E−11 | 1.0555601E−12 | −2.5065441E−12 |
| A17 | 4.2949688E−13 | 3.1552119E−13 | −1.3929119E−13 |
| A18 | −9.0990962E−14 | −2.0138868E−14 | 1.6952879E−14 |
| A19 | −1.8025717E−15 | −9.7986284E−16 | 3.0860955E−16 |
| A20 | 3.9493243E−16 | 8.5861779E−17 | −4.5333491E−17 |

Example 4

Figure 4:
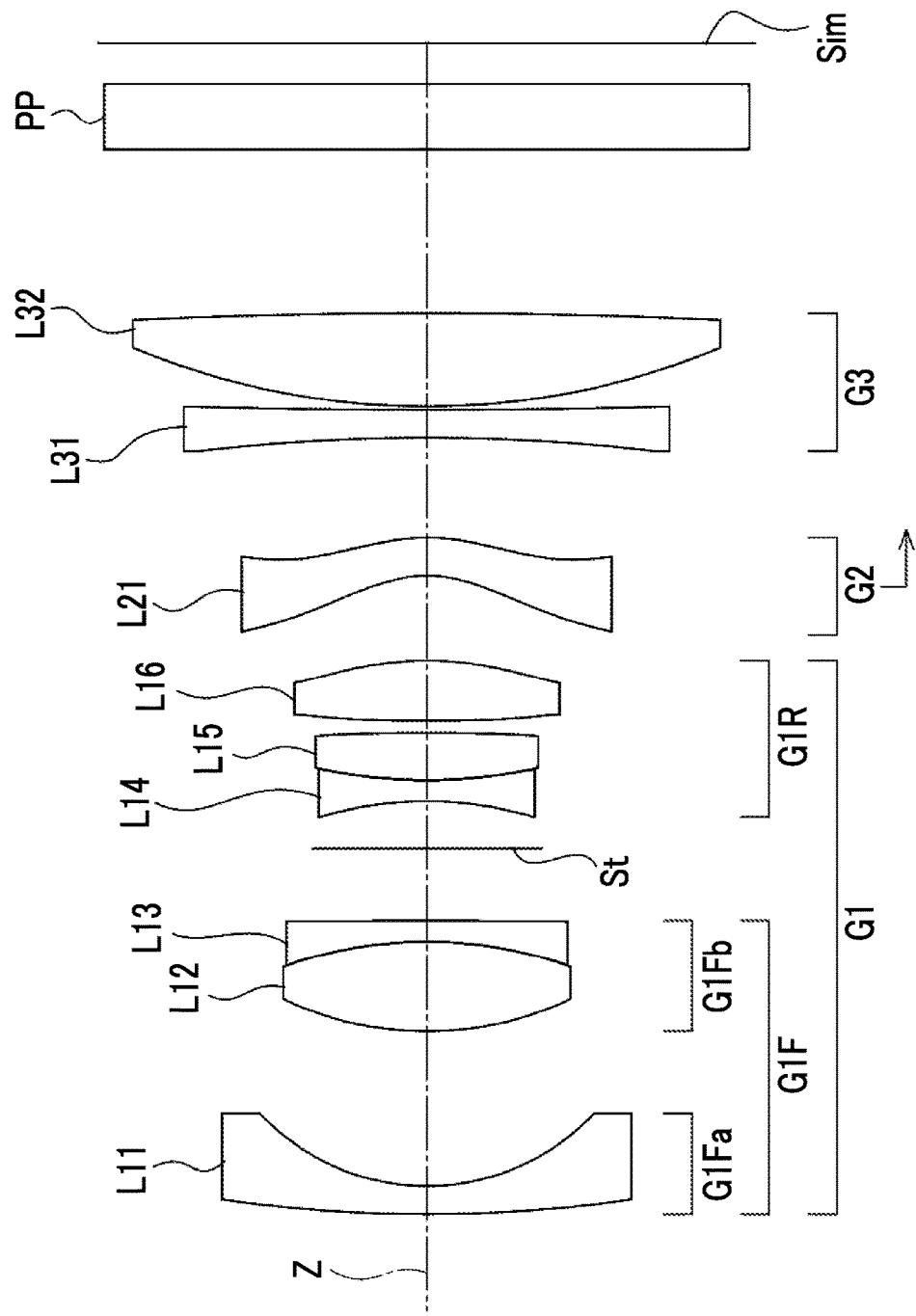
FIG. 4 is a cross-sectional view illustrating a configuration of an imaging lens of Example 4 of the present invention.
Figure 9:
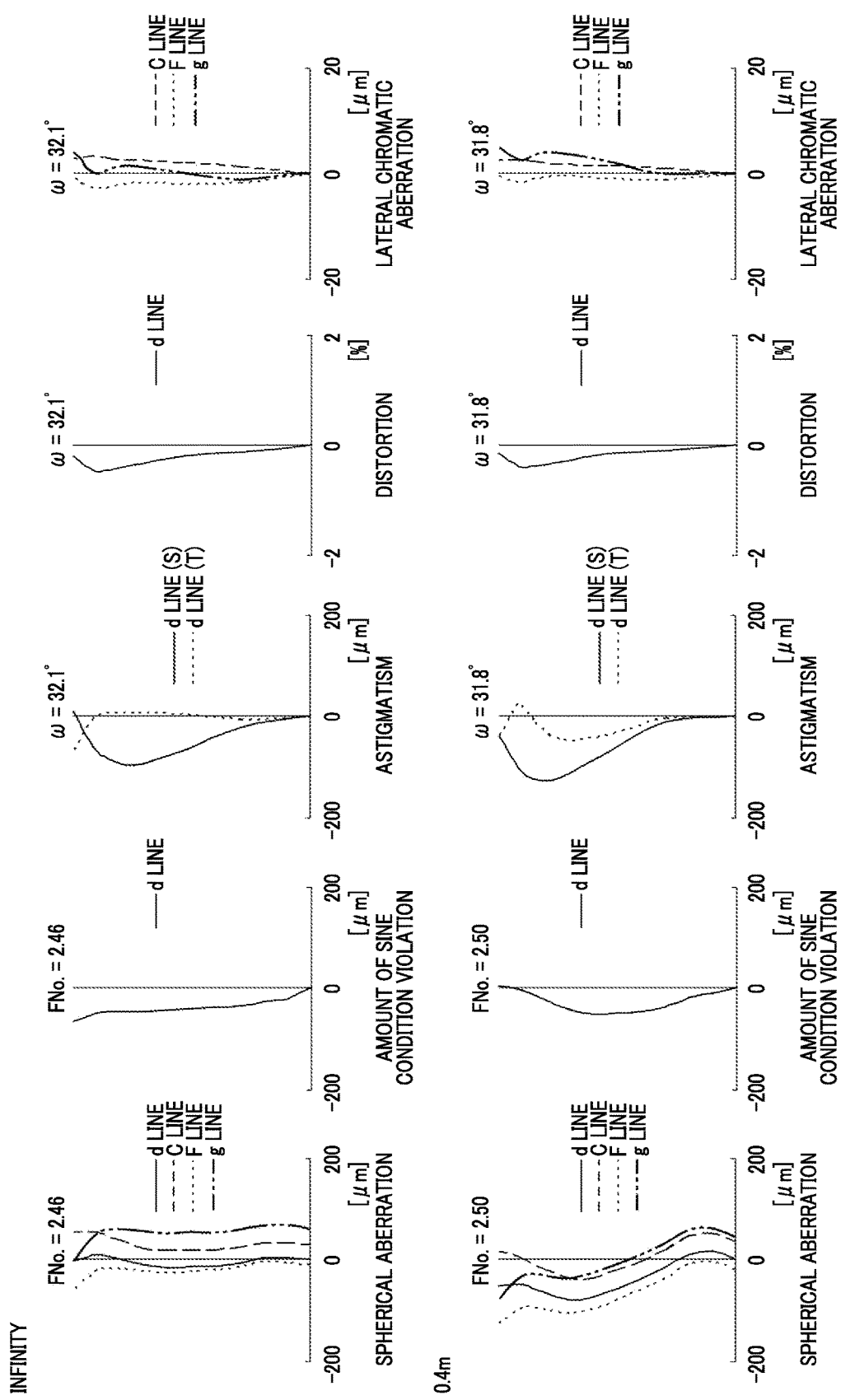
FIG. 9 is a diagram of aberrations of the imaging lens of Example 4 of the present invention.

FIG. 4 shows a lens configuration of an imaging lens of Example 4. The imaging lens of Example 4 has the same configuration as that of the imaging lens of Example 1. The front group Fa sub-lens group G1Fa consists of one lens L11. The front group Fb sub-lens group G1Fb consists of two lenses L12 and L13. The rear group G1R consists of three lenses L14 to L16. The second lens group G2 consists of one lens L21. The third lens group G3 consists of two lenses L31 and L32. The lens L12 and the lens L13 are cemented together. The lens L14 and the lens L15 are cemented together. The other lenses are single lenses which are not cemented. Table 10 shows basic lens data of the imaging lens of Example 4, Table 11 shows specification and variable surface distances, Table 12 shows aspheric surface coefficients, and FIG. 9 shows aberration diagrams.

TABLE 10

Example 4

| Surface Number | R | D | Nd | νd |
|---|---|---|---|---|
| 1 | 62.50346 | 1.200 | 1.48749 | 70.24 |
| 2 | 9.96183 | 6.611 | | |
| 3 | 14.68479 | 3.840 | 1.81600 | 46.62 |
| 4 | −18.48788 | 0.900 | 1.59270 | 35.31 |
| 5 | −971.96239 | 3.086 | | |
| 6 (St) | ∞ | 2.021 | | |
| 7 | −15.88887 | 0.900 | 1.72825 | 28.46 |
| 8 | 21.96464 | 2.026 | 1.62092 | 60.35 |
| 9 | −80.20908 | 0.500 | | |
| *10 | 72.45287 | 2.603 | 1.69350 | 53.20 |
| *11 | −13.59296 | DD[11] | | |
| *12 | −5.55554 | 1.629 | 1.58313 | 59.46 |
| *13 | −8.57512 | DD[13] | | |
| 14 | −85.58746 | 1.200 | 1.94595 | 17.98 |
| 15 | 387.15199 | 0.150 | | |
| 16 | 33.18599 | 3.996 | 1.90366 | 31.31 |
| 17 | −268.38356 | 7.000 | | |
| 18 | ∞ | 2.800 | 1.51680 | 64.20 |
| 19 | ∞ | 1.764 | | |

TABLE 11

Example 4

| | Infinity | 0.4 m |
|---|---|---|
| f | 22.710 | — |
| fnear | — | 22.140 |
| Bf | 10.610 | — |
| FNo. | 2.46 | 2.50 |
| 2ω (°) | 64.2 | 63.6 |
| DD[11] | 3.580 | 4.623 |
| DD[13] | 4.310 | 3.267 |

TABLE 12

Example 4

| | Surface Number | | | |
|---|---|---|---|---|
| | 10 | 11 | 12 | 13 |
| KA | 0.0000000E+00 | 0.0000000E+00 | 0.0000000E+00 | 0.0000000E+00 |
| A3 | 3.3925177E−04 | 6.8690976E−04 | 2.7866940E−04 | −7.1440831E−04 |
| A4 | −5.2745779E−04 | −6.1122147E−04 | 1.0912509E−03 | 2.0308121E−03 |
| A5 | 4.2024877E−04 | 3.0350201E−04 | 3.7191439E−04 | −5.3394525E−04 |
| A6 | −1.1562041E−04 | 1.1843907E−05 | −2.0989596E−04 | 1.4489887E−04 |
| A7 | −1.8158078E−05 | −4.7964248E−05 | 4.2487703E−05 | −2.3538628E−06 |
| A8 | 1.7202824E−05 | 1.0098062E−05 | 7.8240299E−06 | −9.5952429E−06 |
| A9 | −1.5188795E−06 | 2.4630660E−06 | −4.9533244E−06 | 2.1668545E−06 |
| A10 | −9.3667453E−07 | −1.0479442E−06 | 3.1945555E−07 | 1.0491350E−08 |
| A11 | 1.6937290E−07 | −1.2179220E−08 | 1.6976848E−07 | −7.6013685E−08 |
| A12 | 2.5704502E−08 | 4.4113205E−08 | −2.5753811E−08 | 8.9115015E−09 |
| A13 | −6.7721864E−09 | −2.7436668E−09 | −2.1593965E−09 | 8.4352945E−10 |
| A14 | −3.6247267E−10 | −9.2897221E−10 | 6.1083638E−10 | −2.2027934E−10 |
| A15 | 1.3914117E−10 | 9.3549536E−11 | −1.7039080E−12 | 2.0242399E−12 |
| A16 | 2.2869089E−12 | 9.6320963E−12 | −6.3644456E−12 | 2.1109568E−12 |
| A17 | −1.4706622E−12 | −1.2129025E−12 | 2.5701046E−13 | −9.7110157E−14 |
| A18 | −3.7130868E−15 | −3.9796652E−14 | 2.4825750E−14 | −7.3349333E−15 |
| A19 | 6.3342203E−15 | 5.7328465E−15 | −1.5223791E−15 | 4.8113949E−16 |

Table 13 shows values corresponding to Conditional Expressions (1) to (5) of the imaging lenses of Examples 1 to 4. In Examples 1 to 4, the d line is set as the reference wavelength. Table 13 shows the values on the d line basis.

TABLE 13

| Expression Number | | Example 1 | Example 2 | Example 3 | Example 4 |
|---|---|---|---|---|---|
| (1) | \|f2/f\| | 1.235 | 1.930 | 3.283 | 1.487 |
| (2) | f1/f | 0.631 | 0.634 | 0.739 | 0.728 |
| (3) | NdG2 | 1.80610 | 1.80610 | 1.69350 | 1.58313 |
| (4) | vdG2 | 40.73 | 40.73 | 53.20 | 59.46 |
| (5) | \|f2/f3\| | 0.535 | 0.368 | 0.475 | 0.583 |

As can be seen from the above-mentioned data, in each of the imaging lenses of Examples 1 to 4, the focus lens group consists of only one lens. Thereby, high-speed focusing is possible, fluctuation in aberrations during focusing is suppressed, and each of aberrations is satisfactorily corrected. As a result, high optical performance is achieved.

Figure 10:
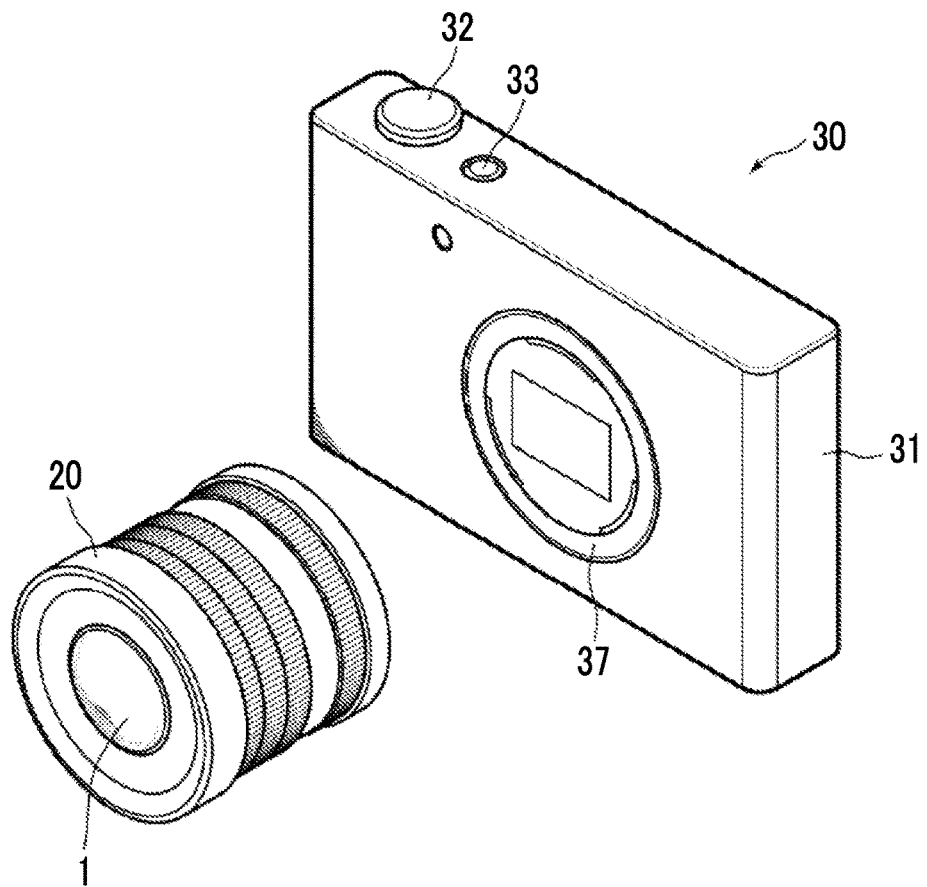
FIG. 10 is a perspective view of the front side of an imaging apparatus according to an embodiment of the present invention.
Figure 11:
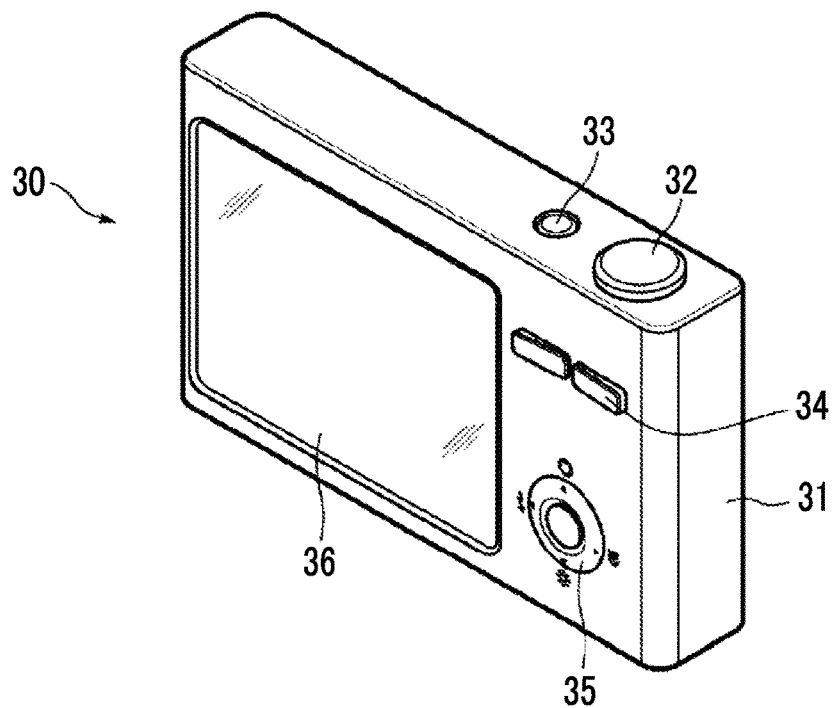
FIG. 11 is a perspective view of the rear side of an imaging apparatus according to an embodiment of the present invention.

Next, an imaging apparatus according to an embodiment of the present invention will be described. FIGS. 10 and 11 are external views of a camera 30 which is the imaging apparatus according to the embodiment of the present invention. FIG. 10 is a perspective view of the camera 30 viewed from the front side, and FIG. 11 is a perspective view of the camera 30 viewed from the rear side. The camera 30 is a single-lens digital camera on which an interchangeable lens 20 is detachably mounted and which has no reflex finder. The interchangeable lens 20 is configured such that the imaging lens 1 according to the above-mentioned embodiment of the present invention is housed in a lens barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a recording medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The recording medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus of the present invention is also not limited to the above-mentioned configurations. For example, the present invention may be applied to a single-lens reflex camera, a film camera, a video camera, and the like.

What is claimed is:

1. An imaging lens consisting of, in order from an object side:
   a first lens group that has a positive refractive power;
   a second lens group that has a negative refractive power; and
   a third lens group that has a refractive power,
   wherein the first lens group consists of, in order from the object side, a front group having a positive refractive power, a stop, and a rear group having a positive refractive power,
   wherein the front group has at least one negative lens and at least one positive lens,
   wherein the rear group has a cemented lens consisting of a negative lens concave toward an image side and a positive lens convex toward the image side in order from the object side,
   wherein the second lens group consists of one negative lens,
   wherein the third lens group has at least one negative lens and at least one positive lens,
   wherein during focusing from an object at infinity to a close-range object, the first lens group and the third lens group remain stationary with respect to an image plane, and the second lens group moves from the object side to the image side, and
   wherein assuming that a focal length of the second lens group is f2 and a focal length of the whole system in a state where the object at infinity is in focus is f, Conditional Expression (1) is satisfied, $$0.8<|f2/f|<5 \tag{1}$$

2. The imaging lens according to claim 1,
   wherein assuming that a focal length of the first lens group is f1, Conditional Expression (2) is satisfied, $$0.4<f1/f<1 \tag{2}$$

3. The imaging lens according to claim 1, wherein a negative lens is disposed to be closest to the object side in the front group.

4. The imaging lens according to claim 1,
   wherein assuming that a refractive index of the negative lens of the second lens group at a d line is NdG2 and an Abbe number of the negative lens of the second lens group at the d line is vdG2, Conditional Expressions (3) and (4) are satisfied, $$1.55<NdG2 \tag{3}$$

$$30<vdG2<65 \tag{4}$$

5. The imaging lens according to claim 1, wherein assuming that a focal length of the third lens group is f3, Conditional Expression (5) is satisfied, $$|f2/f3|<0.67 \tag{5}$$

6. The imaging lens according to claim 1, wherein the third lens group consists of one negative lens and one positive lens.

7. The imaging lens according to claim 1, wherein the front group consists of a negative lens, which is disposed to be closest to the object side, and a front group sub-lens group which is disposed to be separated by an air gap from the negative lens and has a positive refractive power.

8. The imaging lens according to claim 1, wherein the third lens group has a positive refractive power.

9. The imaging lens according to claim 1, wherein the third lens group consists of, in order from the object side, one negative lens and one positive lens.

10. The imaging lens according to claim 1, wherein the rear group has at least one aspheric surface.

11. The imaging lens according to claim 1, wherein Conditional Expression (1-1) is satisfied, $$1<|f2/f|<4 \tag{1-1}$$

12. The imaging lens according to claim 2, wherein Conditional Expression (2-1) is satisfied, $$0.5<f1/f<0.9 \tag{2-1}$$

13. The imaging lens according to claim 4, wherein Conditional Expression (3-1) is satisfied, $$1.55<NdG2<2 \tag{3-1}$$

14. The imaging lens according to claim 4, wherein Conditional Expression (4-1) is satisfied, $$32<vdG2<62 \tag{4-1}$$

15. The imaging lens according to claim 5, wherein Conditional Expression (5-1) is satisfied, $$|f2/f3|<0.6 \tag{5-1}$$

16. An imaging apparatus comprising the imaging lens according to claim 1.

\* \* \* \* \*